(No Model.) 12 Sheets—Sheet 1.
A. W. ARMSTRONG
MAGIC LANTERN.

No. 457,694. Patented Aug. 11, 1891.

(No Model.) 12 Sheets—Sheet 2.
A. W. ARMSTRONG.
MAGIC LANTERN.

No. 457,694. Patented Aug. 11, 1891.

Fig. 2.

Witnesses:
J. A. Rutherford.
Dennis Sumby.

Inventor:
Alfred W. Armstrong.
By James L. Norris.
Attorney.

(No Model.)

A. W. ARMSTRONG.
MAGIC LANTERN.

Patented Aug. 11, 1891.

Fig. 3.

(No Model.) 12 Sheets—Sheet 5.

A. W. ARMSTRONG.
MAGIC LANTERN.

No. 457,694. Patented Aug. 11, 1891.

(No Model.)  A. W. ARMSTRONG.  12 Sheets—Sheet 7.
MAGIC LANTERN.

No. 457,694.  Patented Aug. 11, 1891.

Witnesses.  Inventor.
Alfred W. Armstrong,
By James L. Norris.
Atty.

(No Model.)  12 Sheets—Sheet 8.

A. W. ARMSTRONG.
MAGIC LANTERN.

No. 457,694. Fig. 7. Patented Aug. 11, 1891.

Fig. 6.

Witnesses:
J. A. Rutherford
Dennis Sumby

Inventor:
Alfred W. Armstrong
By James L. Norris
Attorney (No Model.) 12 Sheets—Sheet 9.

A. W. ARMSTRONG.
MAGIC LANTERN.

No. 457,694. Patented Aug. 11, 1891.

Witnesses.
A. K. Norris.
Robert Everett.

Inventor.
Alfred W. Armstrong.
By James L. Norris.
Atty.

(No Model.)
12 Sheets—Sheet 10.

A. W. ARMSTRONG.
MAGIC LANTERN.

No. 457,694. Patented Aug. 11, 1891.

(No Model.) 12 Sheets—Sheet 11.

A. W. ARMSTRONG.
MAGIC LANTERN.

No. 457,694. Patented Aug. 11, 1891.

Fig. 2ᵃ

Witnesses.
J. A. Rutherford
Robert Everett

Inventor:
Alfred W. Armstrong.
By James L. Norris
Att'y.

(No Model.) 12 Sheets—Sheet 12.

A. W. ARMSTRONG.
MAGIC LANTERN.

No. 457,694. Patented Aug. 11, 1891.

Witnesses:
A. H. Norris.
Robert Everett.

Inventor:
Alfred W. Armstrong.
By James L. Norris.
Atty.

UNITED STATES PATENT OFFICE.

ALFRED WILLIAM ARMSTRONG, OF LONDON, ENGLAND.

MAGIC LANTERN.

SPECIFICATION forming part of Letters Patent No. 457,694, dated August 11, 1891.

Application filed December 14, 1889. Serial No. 333,763. (No model.)

*To all whom it may concern:*

Be it known that I, ALFRED WILLIAM ARMSTRONG, electrical engineer, a subject of the Queen of Great Britain, and a resident of London, England, have invented certain new useful Improved Means for Advertising and for Indicating the Departure, Arrival, and Stopping-Places of Trains, of which the following is a specification, reference being had to the accompanying drawings.

This invention has for its objects to provide a novel apparatus for exhibiting pictorial advertisements and other matter of a similar nature; to provide a novel apparatus which can be employed for indicating the departure, the arrival, and the stopping-places of railway-trains, and to provide novel means for automatically and in regular order projecting advertisements or other matter upon substantially vertical surfaces.

To accomplish all these objects my invention involves the features of construction, the combination or arrangement of elements, and the principles of operation hereinafter described and claimed, reference being made to the accompanying drawings, in which—

Like letters indicate corresponding parts throughout the drawings.

A is the box or case of the apparatus.
B is the clock-face.
C C are the hands thereof.
D is an ordinary train of clock-work for imparting motion thereto.

$a\ a$ are the pictures intended to be reflected. The said pictures $a$ are carried in frames $b$, supported upon radial arms $b'$, firmly attached to a boss $b^2$, keyed or otherwise secured upon a shaft or spindle $c$. The shaft or spindle $c$ is carried in suitable bearings $c'$ in frames or plates $d$, supported upon a bracket $d'$, attached to the box or case A. $e$ is a pinion firmly secured in any suitable manner upon the said shaft or spindle $c$ ard gearing with one of an ordinary train of clock-work wheels $f$, which normally tends to rotate the said pinion $e$ and shaft or spindle $c$.

Figure 5:
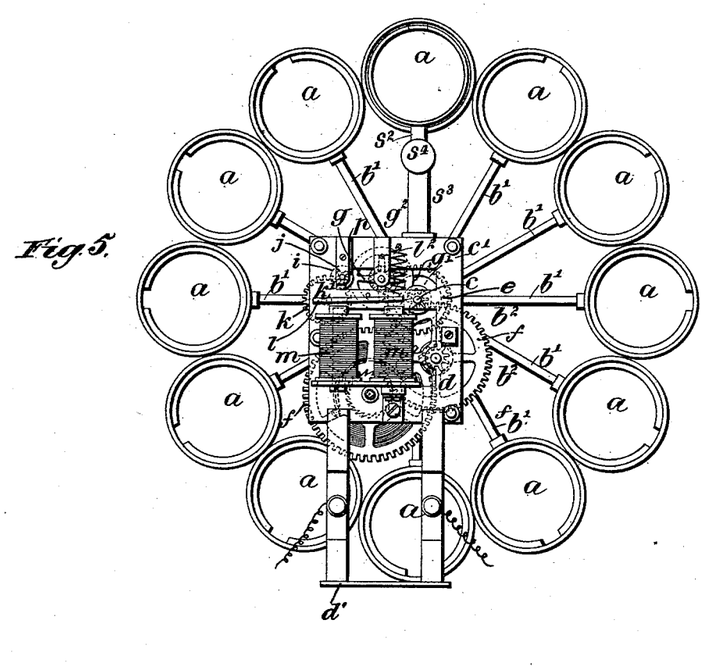
Fig. 5 is a rear elevation showing one form of my improved apparatus. Figs. $5^a$, $5^b$, and $5^c$ are still further detail views, on a larger scale, illustrating another portion of the mechanism illustrated in Fig. 2.
Figure 5A:
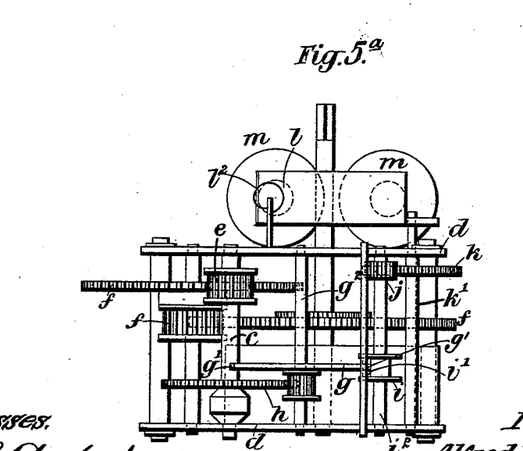
Figure 5B:
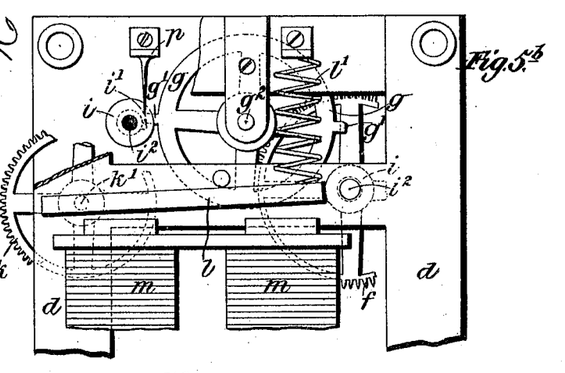
Figure 5C:
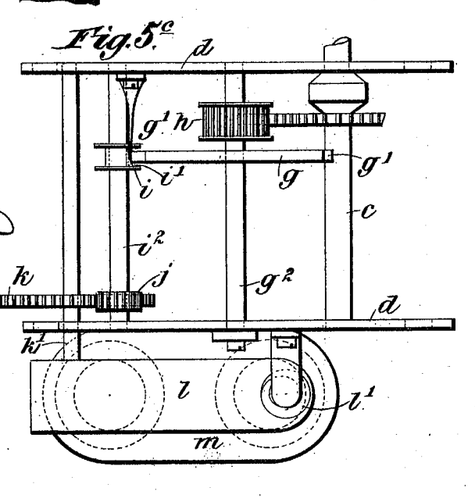

$g$ is a wheel or disk provided with two teeth or projections $g'$. The said wheel or disk $g$ is secured upon a shaft or spindle $g^2$, also supported in suitable bearings in the frames or plates $d$, and is connected with the shaft or spindle $c$ by means of toothed gear $h$. One or other of the teeth or projections $g'$ normally engages with a tooth or projection $i'$ upon a wheel or pinion $i$, and thus prevents the rotation of the spindle $c$ under the action of the train of clock-work $f$, as shown in detail in Figs. $5^a$, $5^b$, and $5^c$.

The wheel or pinion $i$ is firmly secured upon a shaft or spindle $i^2$, supported in suitable bearings in the plates or frames $d$, so as to be free to rotate therein. $j$ is another pinion, also firmly secured upon the shaft or spindle $i^2$, which gears with a toothed wheel $k$, the shaft or spindle $k'$ of which is rigidly secured to the armature $l$ of an electro-magnet $m$, as more clearly shown in Fig. $5^a$. The said armature $l$ is so arranged that it moves freely with the shaft or spindle $k'$, which is carried in suitable bearings in the plates or frames $d$, and is provided with a spiral or other suitable spring $l^2$, which tends normally to retain the said armature out of connection or away from the poles of the said electro-magnet $m$.

$n\ n$ are the wires or conductors which connect the said electro-magnet with the poles of a battery $o$. The said circuit $n$ is normally broken or interrupted, and is periodically made or completed for a given length of time in the manner hereinafter described. During the time for which the said circuit is made or completed the armature $l$ is drawn down or attracted against the poles of the electro-magnet $m$, the toothed wheel $k$, the shaft or spindle $k'$ of which is rigidly secured, as above described, to the said armature, partakes of this motion, and consequently moves the pinion $j$ through a certain angle, and therefore also the wheel or pinion $i$, so as to release the tooth or projection $g'$ from the tooth or projection $i'$ and permit the wheel $g$ to make half a revolution under the action of the train of clock-work $f$, and moreover at the same time to rotate the shaft or spindle $c$ and the pictures $d$, so as to bring the next following or succeeding one into the requisite position for throwing a reflection of the picture or other matter that may be thrown upon the face B of the clock in the manner hereinafter described.

$p$ is a spring which acts as a brake by bearing against one of the projections or teeth $g'$ of the wheel or disk $g$ during the latter part of its movement and before it engages with the tooth or projection $i'$ on the wheel or pinion $i$.

Figure 3:
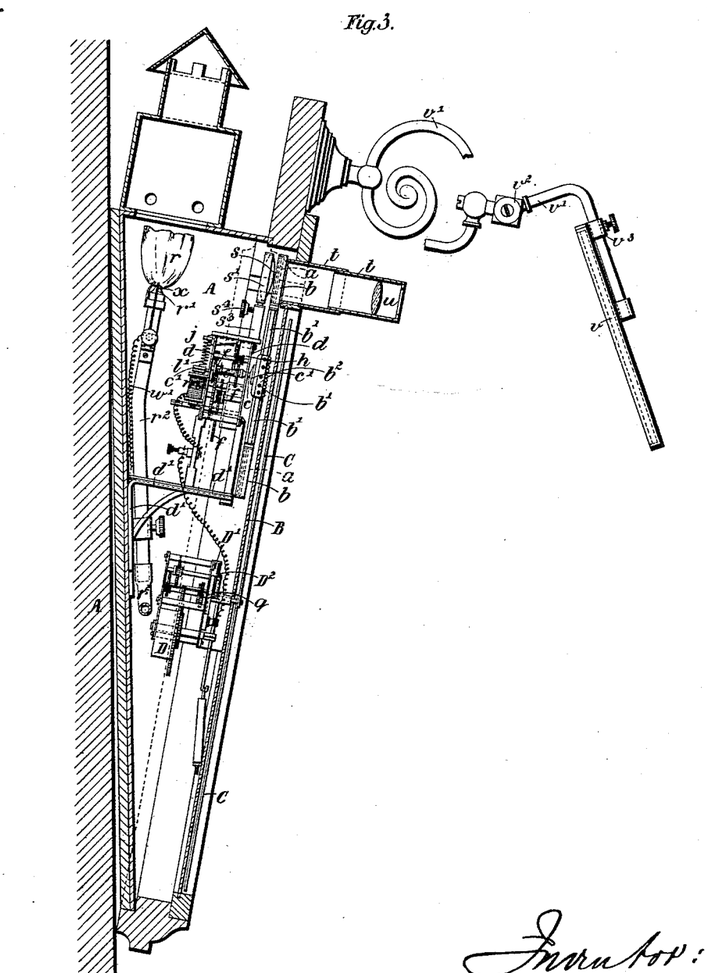
Fig. 3 is a vertical section on the line $x\ x$, Figs. 1 and 2. Figs. $3^a$, $3^b$, and $3^c$ are detail views, on a larger scale, of portions of the mechanism exhibited by Fig. 3.
Figure 3A:
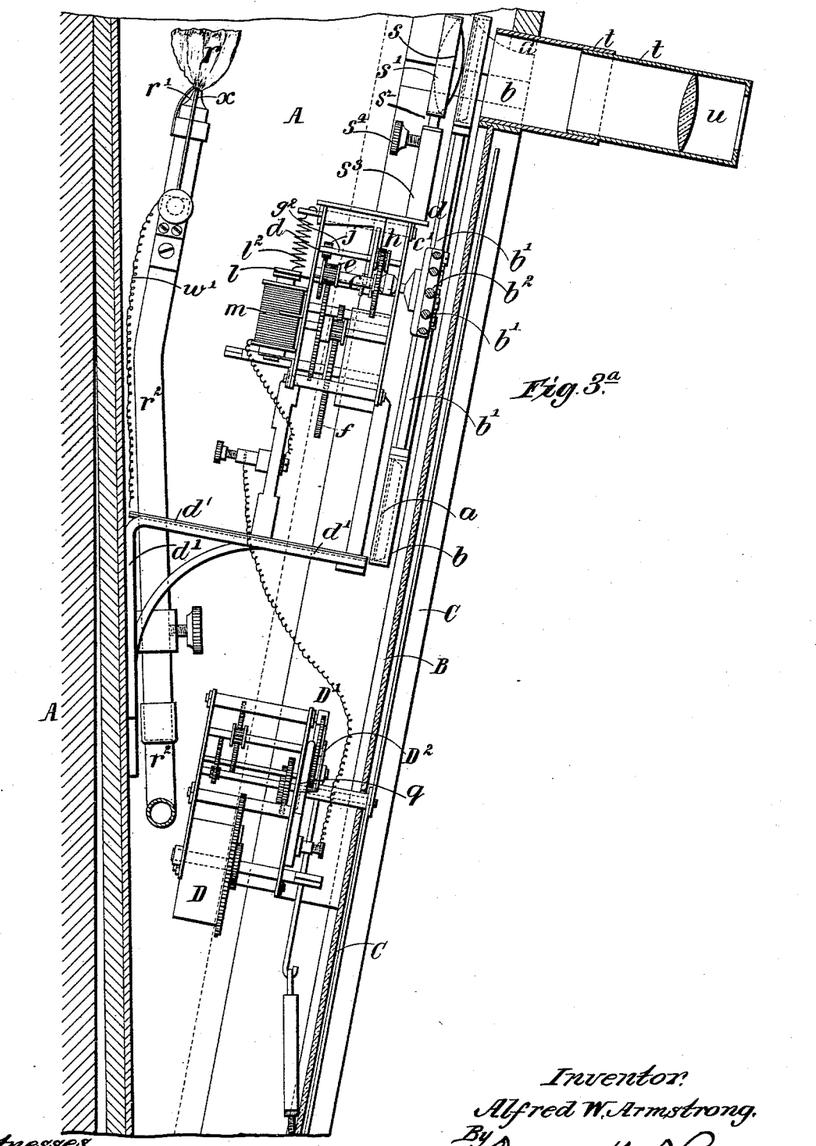
Figure 3B:
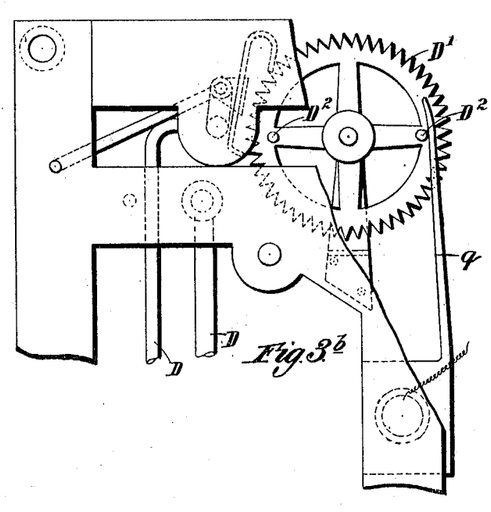
Figure 3C:
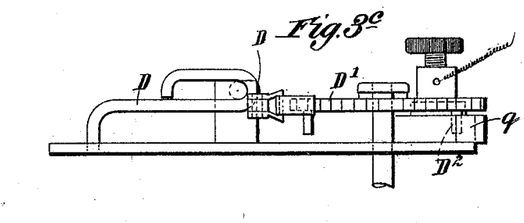
Figure 4:
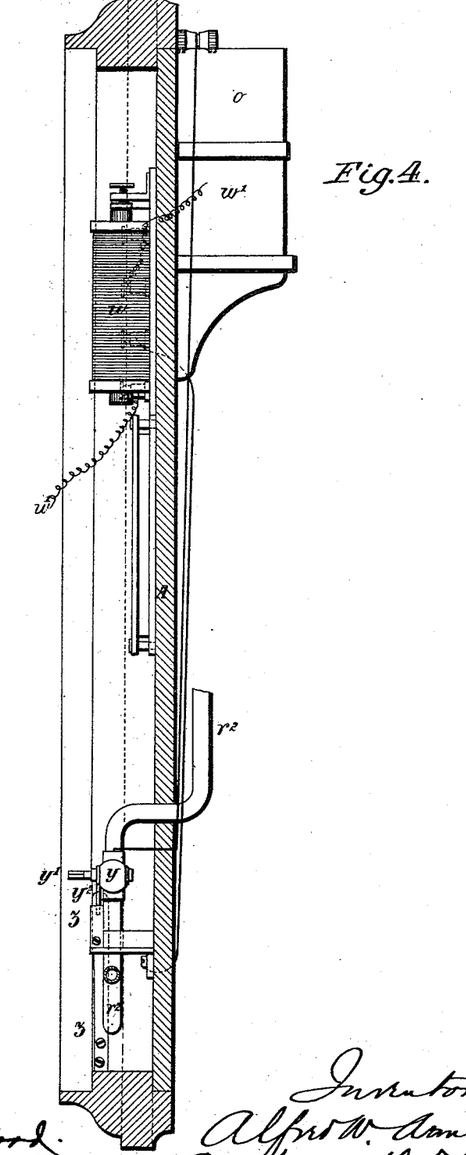
Fig. 4 is a vertical section on the line $y\ y$, Figs. 1 and 2.

To make or complete the circuit $n$ periodically or at stated intervals for a given time, the escapement-wheel $D'$ of the clock-work D is provided with contact studs, pins, or projections $D^2$, Figs. $3^b$ and $3^c$, adapted to form contact with the spring-contact $q$, and to remain in contact therewith for a predetermined period twice in each revolution of the said wheel, thus making or completing the circuit $n$, which is normally interrupted or broken, and releasing the detent-wheel $g$ in the manner above described, so as to permit the clock-work $f$ to rotate the arms $b'$, the frames $b$, and the pictures $a$, so as to bring another of the said pictures into position.

$r$ is a gas-jet or other suitable light, which is preferably placed edgewise to the picture $a$.

$r'$ is the burner; $r^2$, a pipe communicating with any suitable source of gas-supply.

S is a lens for condensing the said light upon the said picture $a$. The lens S is carried in a suitable frame $S'$, provided with a stem $S^2$, which fits into a corresponding hole provided in a bracket $S^3$, secured to the frames or plates $d$. The height of the said lens can be regulated by means of the thumb-screw $S^4$.

$t\,t$ are telescopic sections provided with an ordinary magic-lantern or other lens $u$.

$v$ is a reflector formed of any suitable material. The reflector $v$ is carried upon an arm $v'$ secured to the box or case A. $v^2$ is a joint permitting of angular adjustment, and $v^3$ is a joint permitting of vertical and angular adjustment of the said reflector $v$ in relation to the magic-lantern or other lens $u$. The images of the pictures or other advertising matter or information upon the pictures $a$ are thrown upon the said reflector $v$, and from the latter are reflected back upon the clock-face B or upon any other suitable surface.

By varying the number of contact studs, pins, or projections $D^2$ upon the escapement-wheel $D'$ the pictures $a$, and consequently the picture or other matter reflected upon the clock-face or other surface, may be changed any suitable number of times in a minute.

When gas is employed for producing the light, I employ a device for effecting the lighting thereof automatically, comprising an electro-magnet $w'$, which is electrically connected by means of wires or conductors $w'$ with an electric lighter $x$ of any ordinary construction.

$y$ is the cock or valve for closing or opening the supply of gas to the burner $r'$. The plug of the cock or valve $y$ is provided with a square portion $y'$, adapted to receive a key for turning the said cock or valve, so as to open or close the same.

Figure 1:
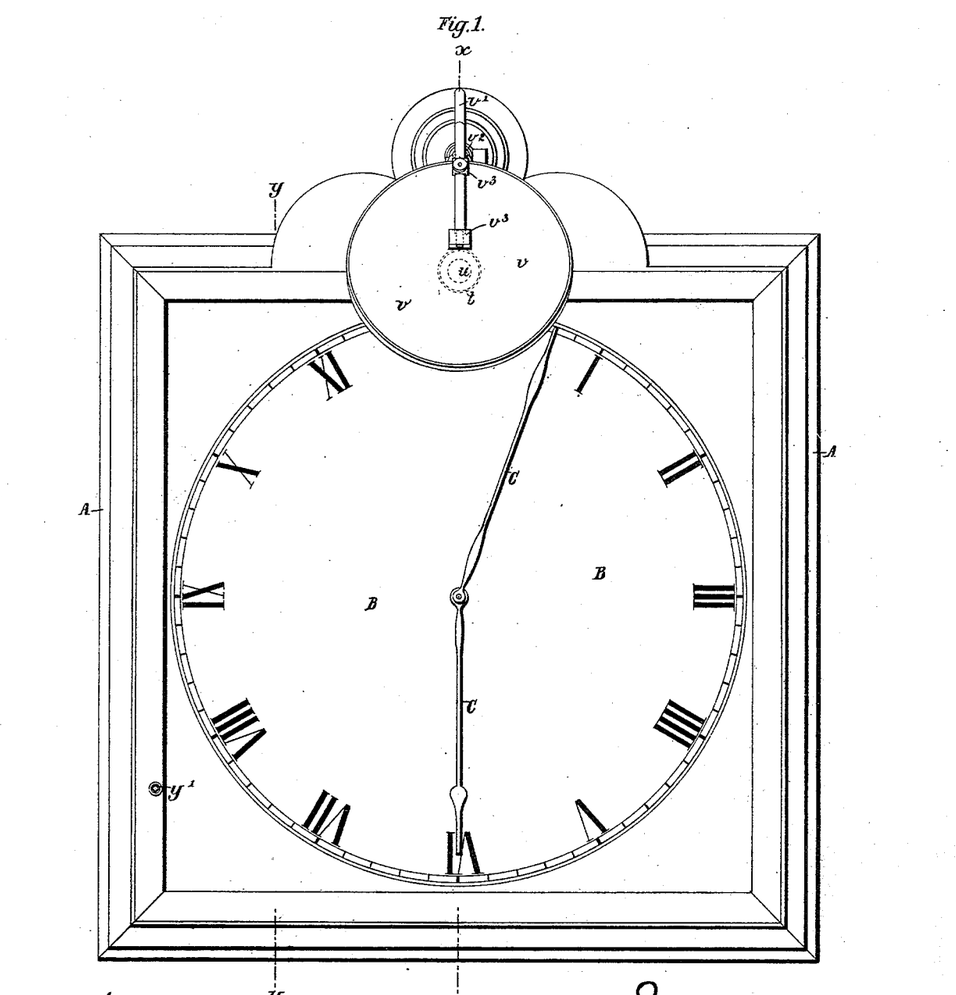
Figure 1 is a front elevation of an apparatus embodying my invention.
Figure 2:
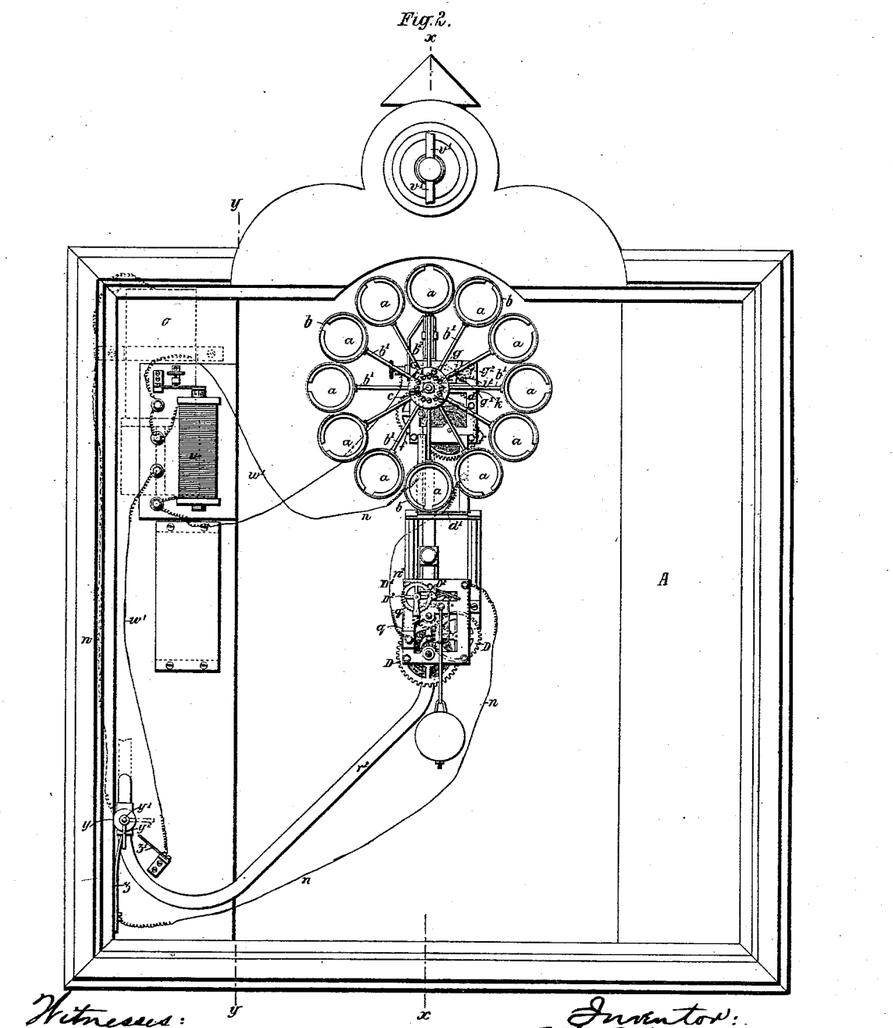
Fig. 2 is a similar view to Fig. 1, the clock-face or front of the apparatus being removed. Fig. $2^a$ is a detail view, on a larger scale, showing a part of the mechanism exhibited by Fig. 2.
Figure 2A:
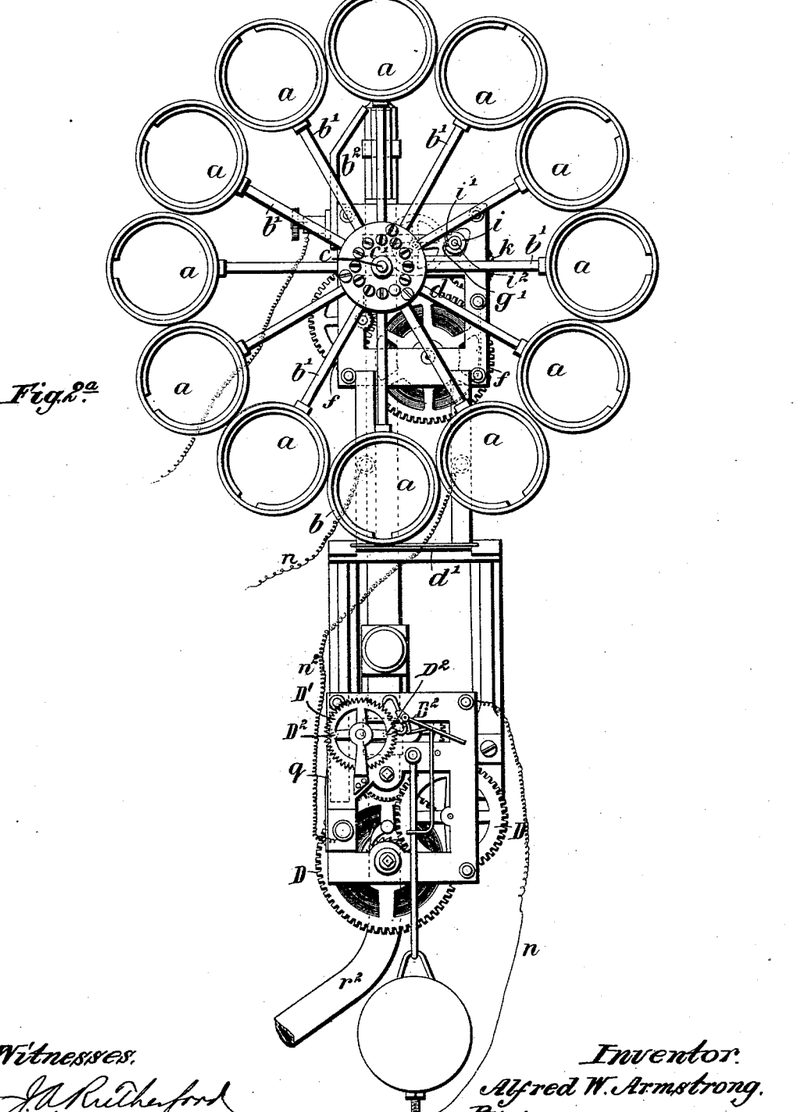

$y^2$ is a contact-piece, either attached to or formed in one with the plug and adapted to move therewith, which forms or makes contact with a spring contact-piece $z$ when the said plug is turned so as to open the cock or valve $y$, and thus completes the circuit $n$, which is normally broken when the said cock or valve is closed, as shown by the dotted lines, Fig. 2. I thus provide for breaking or interrupting the electric circuit to the clock-work D, when the light $r$ is extinguished, and thus prevent the mechanism from operating to rotate the pictures $a$ when there is no light in the apparatus and for completing the said circuit when the gas is turned on. $z'$ is another spring contact-piece, against which the said contact-piece $y^2$ bears during the movement of turning the plug to open the cock or valve $y$. The contact-pieces $y^2$ and $z'$ close or complete the circuit $w'$ through the electro-magnet $w$ and the electric lighter $x$, thus heating the wire or filament of the said lighter to incandescence, and thereby lighting the jet of gas $r$, issuing from the burner $r'$, provided upon the extremity of the pipe $r^2$.

In some instances instead of placing the clock which regulates or governs the periodical changing or movement of the pictures in the same apparatus, I employ a separate clock which may be situated in any convenient position at a distance therefrom for that purpose.

The operation of the apparatus is as follows—that is to say, the clock, which regulates or governs the said periodical changing or movement of the pictures, and the clock-work, which imparts motion to the latter, being wound up, the gas is turned on and the jet $r$ is automatically lighted, in the manner hereinbefore described. The picture or other matter upon the picture situated between the magic-lantern or other lens $u$ and the condensing-lens $s$ is thrown upon the reflector $v$ in the usual manner, and from thence is reflected back upon the clock-face B. The escapement-wheel D' of the clock-work D during its rotation causes one of the contact pins, studs, or projections D² to engage with the spring contact-piece q, thereby completing the circuit n, and, through the electromagnet m, armature l, and toothed wheel k, moving the pinion j and the wheel or pinion i, so as to release the tooth or projection g' of the wheel g and allow the clock-work f to work so as to rotate the arms b' and frames b sufficiently to bring another of the pictures in front of the magic-lantern or other lens u. The contact between the pieces D² and q is arranged to be of sufficient duration to release clock-work f, and when this contact ceases the circuit n is again broken. Consequently the armature l resumes its normal position under the action of the spring l², and the wheel or pinion i is moved back to its original position by the pinion j and toothed wheel k, so that the next or succeeding tooth or projection g' engages with the tooth or projection i' upon the wheel or pinion i. The force with which it would otherwise come into contact with the said tooth or projection is reduced by the brake-spring p. The alteration of the pictures a may be arranged to take place any desired number of times per minute by increasing or diminishing the number of the studs, pins, or projections D² upon the escapement-wheel D'.

Figure 6:
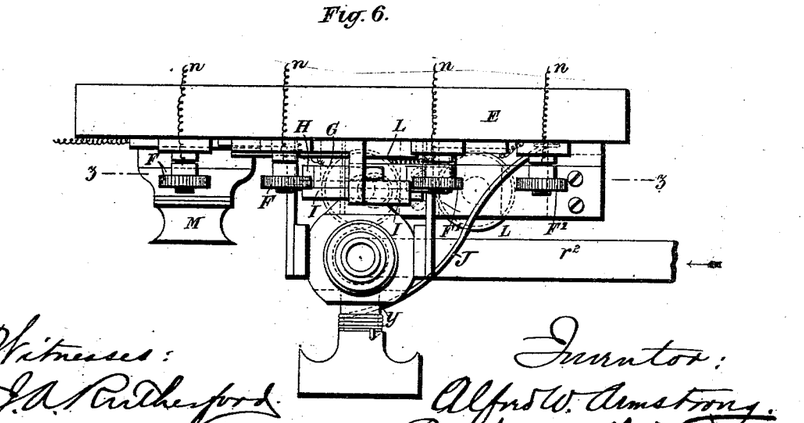
Fig. 6 is a plan.
Figure 7:
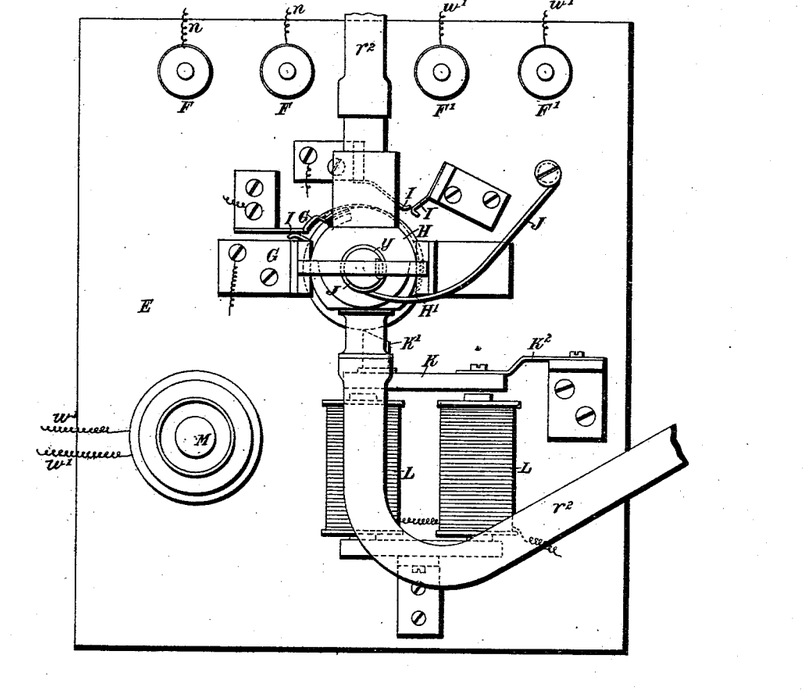
Fig. 7 is a front elevation, the front portion of the box or case being removed, showing an improved switch-board, hereinafter described.
Figure 8:
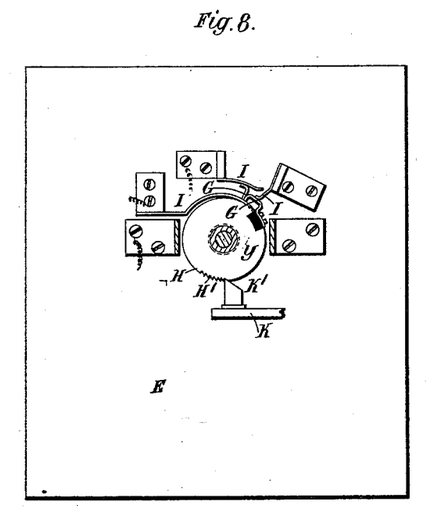
Fig. 8 is a section on the line $z\ z$, Fig. 6, showing some of the parts in a different position.
Figure 9:
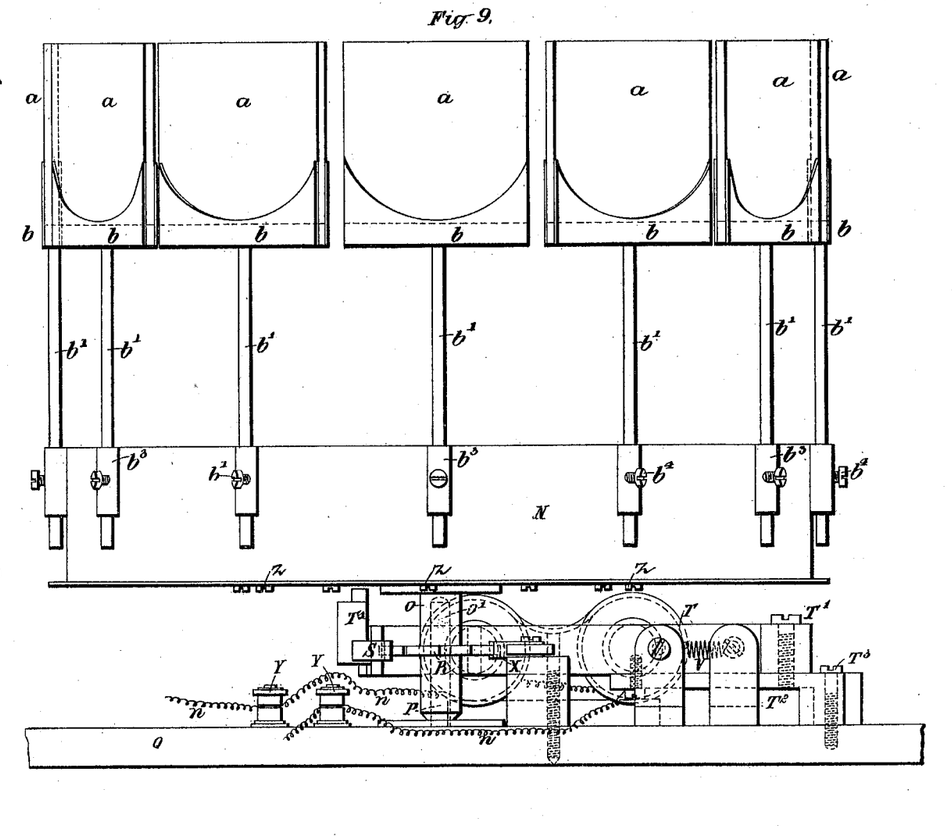
Fig. 9 is a front elevation.
Figure 10:
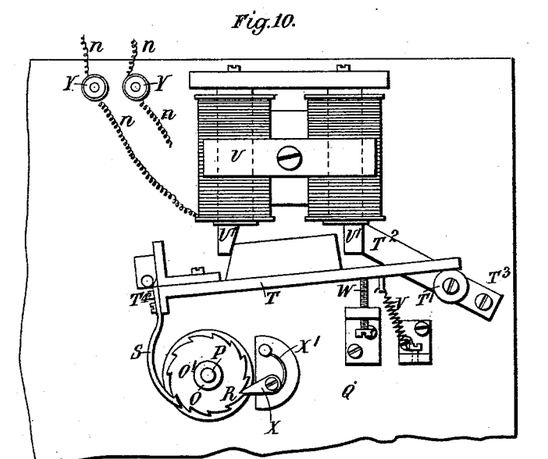
Fig. 10 is a plan, some of the parts being removed.
Figure 11:
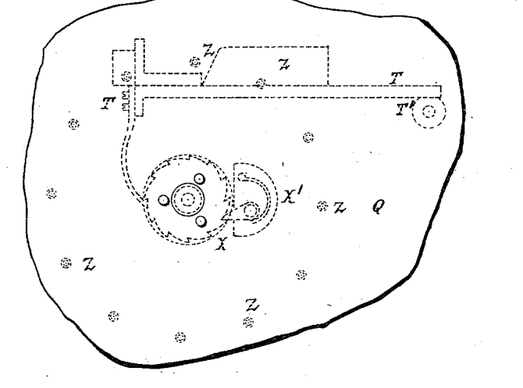
Fig. 11 is an under side view, some of the parts being in a different position, showing a modification hereinafter described.

Figs. 6 to 8 illustrate a device which I sometimes employ for extinguishing the light at any given time. E is a switch-board provided with suitable binding posts or terminals F for the circuit n and with suitable binding posts or terminals F' for the circuit w' to the electric lighter. G G are contact-pieces attached to a disk H, secured to the plug of the cock or valve y, so as to turn therewith. When the said cock or valve is closed, the circuits n and w' are broken; but when the said cock or valve is open the contact-pieces G engage with other contact-pieces I, attached to the switch-board E, so as to complete the circuits n and w'. In order to provide for automatically extinguishing the light by turning off the supply of gas and arresting the operation of the object-glass-changing mechanism at a given time, I provide a spring J, one extremity of which is attached to the switch-board E and the other extremity to the stem of the plug of the said cock or valve y in such a manner that when the said plug is turned so as to open the cock or valve y a portion of the aforesaid spring will be caused to wind or coil round the same, thus causing a constant tendency of the said plug to turn, so as to close the cock or valve y. To maintain the said cock or valve open, I provide upon the disk H ratchet-teeth H', and upon the armature K of an electro-magnet L a tooth or pawl K', adapted to engage with the said ratchet-teeth H'. The said armature is carried upon a flat or ribbon spring K², which tends to maintain the tooth or pawl K' upon the said armature engaged with the ratchet-teeth H'. Upon the face of the clock I provide a suitable contact-piece, which can be adjusted so as to form or make contact with the hour-hand of the said clock at any given predetermined time and thus close or complete a circuit in which the electro-magnet L is included. The armature K is thus attracted or drawn down to the poles of the said electro-magnet, and the tooth or pawl K' is released from the ratchet-teeth H' upon the disk H, thus permitting the plug of the cock or valve y to turn, so as to close the latter under the action of the spring J and shut off the supply of gas in the pipe r² from the burner r', and, moreover, at the same time interrupt or break the circuits n and w'. To complete the circuit w' to the electric lighter when the gas is turned on, I provide in this instance a push-piece M, attached to the switch-board E. When the stop-cock or valve y is opened and the contacts G and I are made, the push-piece M is operated, so as to complete the circuit w' to the said electric lighter and thus light the gas-jet r in the usual manner.

Figs. 9 to 12 illustrate a modification wherein I provide for rotating the pictures a by means of electricity. In this case the said pictures a are carried in frames b, the rods or stems b' of which are supported vertically in sockets b³, attached to a circular frame or carrier N, arranged horizontally. b⁴ b⁴ are set-screws, by means of which the height of the said frames b may be adjusted. The circular frame or carrier N is firmly attached to a shaft or spindle O, which is provided with a hole O', in which is adapted to fit a pin P, firmly attached to a base-plate or bed-plate Q. Upon the shaft or spindle O is keyed or otherwise secured a ratchet-wheel R. S is a hooked spring-pawl attached to one extremity of the armature T of an electro-magnet U and arranged to engage with the teeth of the said ratchet-wheel R. The armature T is pivoted at T' to a plate T², attached to the base-plate or bed-plate Q, by means of a screw T³, or in any other suitable manner. V is a spiral spring, which is attached at one extremity to the armature T and at the other to the bed-plate or base-plate Q. The said spring tends to retain the said armature normally away from the poles of the electro-magnet U and the hooked spring-pawl S, engaged with one of the teeth of the ratchet-wheel R. W is an adjustable stop for regulating the throw of the armature T. X is a catch provided with a spring X' and arranged to engage with the teeth upon the ratchet-wheel R, so as to prevent any backward movement of the latter. Y Y are binding posts or terminals for the wires or conductors n from the clock which regulates the periodical changing of the picture a. When the circuit n has been made or completed by the said clock-work, in the manner hereinbefore described, or in any other suitable manner, the electric current passing in through the electro-magnet U draws or attracts the armature T thereto, overcoming the strength of the spring V and the resistance of the circular frame or carrier N, and by means of the hooked spring-pawl S and the ratchet-wheel R, rotating the said circular frame or carrier N through a given angle, so as to bring another of the pictures $a$ into position between the condensing and magic-lantern lens. When the circuit $n$ is again interrupted by the action of the clock-work, the armature T resumes its position under the action of the spring V and engages again with another tooth of the ratchet-wheel R. Z Z are stops provided upon the under side of the carrier Q, against which is adapted to engage a projection $T^4$, attached to the said armature T, during the motion of the latter, thereby insuring the rotation of the said circular frame or carrier N through the requisite distance.

Figure 12:
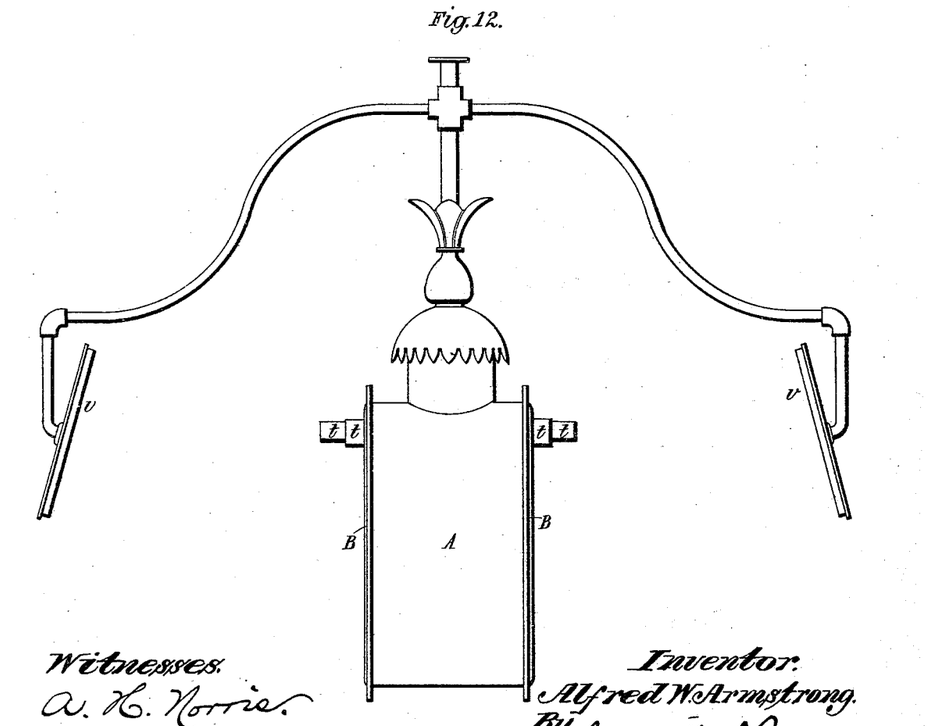
Fig. 12 is a front elevation, showing a further modification hereinafter described.

Fig. 12 is a modification illustrating an application of my invention to a double-faced clock. A is the casing, which is provided with two clock-faces B, each of which is fitted with telescopic slides $t$, magic lantern or other lenses, and reflectors $v$, similar to those hereinbefore described.

What I claim is—

1. The combination, with a magic lantern having a set of pictures and mechanism which successively moves the pictures into position between the light and lens of the lantern, of electro-magnetic mechanism for governing the picture-moving mechanism and the source of light to the lantern, substantially as described.

2. The combination, with a magic lantern having a series of traveling pictures, of actuating mechanism for successively moving the pictures into alignment with the lens, a burner supplied with illuminant, and means for closing the supply of illuminant to the burner and simultaneously therewith stopping the actuating mechanism of the pictures, substantially as described.

3. The combination, with a magic lantern having a traveling series of pictures, actuating mechanism for successively moving the pictures into alignment with the lens, a burner supplied with illuminant, a cock or valve for controlling the supply of illuminant to the burner, and means for automatically closing the cock or valve and arresting the action of the mechanism which actuates the pictures, substantially as described.

4. The combination, with a magic lantern and a set of pictures, of the spring-actuated mechanism for successively bringing the pictures into alignment with the lens, the magnet $m$, and armature $l$, connected with said mechanism, so that the energizing of the magnet will release the spring-actuated mechanism, substantially as described.

5. The combination, with the lens $s$, the pictures $a$, and mechanism for rotating said pictures, and a source of light, of electro-magnetic mechanism controlling the picture-rotating mechanism and source of light, and a single circuit-closer for said magnetic mechanism, substantially as described.

6. The combination of a frame or case, a magic lantern, clock-work mechanism for automatically changing or shifting the pictures or slides of the lantern, an electric circuit, clock-work mechanism for periodically completing and breaking the electric circuit for effecting the release and permitting the operation of the first clock-work mechanism to change or shift the said pictures or slides, all inclosed in the said frame or case, and a mirror or reflector arranged so that the rays of light passing through the lens of the magic lantern will be reflected upon the said frame or case or upon a surface in front of the same, for the purpose specified.

In testimony whereof I have hereunto signed my name in the presence of two subscribing witnesses.

ALFRED WILLIAM ARMSTRONG.

Witnesses.
  A. MIXA,
  A. G. WEAVER.